(12) United States Patent
Mehandjiysky et al.

(10) Patent No.: US 11,204,631 B2
(45) Date of Patent: Dec. 21, 2021

(54) ELECTRONIC DEVICES WITH FLEXIBLE DISPLAYS

(71) Applicant: Hewlett-Packard Development Company, L.P., Spring, TX (US)

(72) Inventors: Dimitre Mehandjiysky, Spring, TX (US); Kevin L Massaro, Spring, TX (US); Zheng Cao, Spring, TX (US); Jack Godfreywood, San Francisco, CA (US); Oliver Poyntz, London (GB); Marcus A Hoggarth, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 655 days.

(21) Appl. No.: 16/074,384

(22) PCT Filed: Jun. 1, 2016

(86) PCT No.: PCT/US2016/035144
§ 371 (c)(1),
(2) Date: Jul. 31, 2018

(87) PCT Pub. No.: WO2017/209744
PCT Pub. Date: Dec. 7, 2017

(65) Prior Publication Data
US 2021/0191478 A1 Jun. 24, 2021

(51) Int. Cl.
*G06F 1/18* (2006.01)
*G09F 9/30* (2006.01)
*G06F 1/16* (2006.01)

(52) U.S. Cl.
CPC .............. *G06F 1/181* (2013.01); *G09F 9/301* (2013.01); *G06F 1/1652* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,432,331 | B2* | 4/2013 | Schilling | H04M 1/0247 345/1.3 |
| 9,081,540 | B1* | 7/2015 | Cho | G06F 1/1601 |
| 9,123,290 | B1* | 9/2015 | Cho | G09F 9/301 |
| 9,606,384 | B2* | 3/2017 | Kim | G02F 1/133308 |
| 9,829,069 | B2* | 11/2017 | Park | F16H 1/16 |
| 10,234,905 | B2* | 3/2019 | Chen | G06F 1/1681 |

(Continued)

FOREIGN PATENT DOCUMENTS

| | | |
|---|---|---|
| CN | 103941456 | 7/2014 |
| CN | 103943031 A | 7/2014 |

(Continued)

OTHER PUBLICATIONS

Crawford—"Flexible Flat Panel Display Technology"—http://citeseerx.ist.psu.edu—2005—10 pages.

*Primary Examiner* — Lisa Lea-Edmonds
(74) *Attorney, Agent, or Firm* — HP Inc. Patent Department

(57) ABSTRACT

Examples disclosed herein provide electronic devices with flexible displays. An example electronic device includes a flexible display and a supporting structure arranged at a back of the flexible display. As an example, the supporting structure is to synchronously curve the flexible display when a proximal end of the electronic device is to be actuated.

11 Claims, 5 Drawing Sheets

(56) References Cited

U.S. PATENT DOCUMENTS

| | | | |
|---|---|---|---|
| 10,234,907 B2* | 3/2019 | Knoppert | G06F 1/1652 |
| 10,290,240 B2* | 5/2019 | Kang | G06F 1/1652 |
| 10,476,011 B2* | 11/2019 | Kang | H05K 1/189 |
| 10,659,577 B2* | 5/2020 | Nam | G06F 1/1681 |
| 2009/0275366 A1* | 11/2009 | Schilling | G06F 1/1654 |
| | | | 455/566 |
| 2013/0155655 A1 | 6/2013 | Lee et al. | |
| 2014/0198465 A1* | 7/2014 | Park | G09F 9/301 |
| | | | 361/749 |
| 2014/0328041 A1 | 11/2014 | Rothkopf et al. | |
| 2015/0029166 A1* | 1/2015 | Park | G09G 3/20 |
| | | | 345/184 |
| 2015/0043136 A1* | 2/2015 | Kim | G02F 1/133305 |
| | | | 361/679.01 |
| 2015/0092361 A1* | 4/2015 | Cho | H01L 51/5237 |
| | | | 361/749 |
| 2015/0153787 A1 | 6/2015 | Mok et al. | |
| 2015/0192952 A1 | 7/2015 | Jung et al. | |
| 2015/0192962 A1 | 7/2015 | Min et al. | |
| 2015/0195932 A1 | 7/2015 | Lee et al. | |
| 2015/0301672 A1 | 10/2015 | Kim et al. | |
| 2015/0346537 A1 | 12/2015 | Yu et al. | |

FOREIGN PATENT DOCUMENTS

| | | |
|---|---|---|
| CN | 105390069 | 3/2016 |
| TW | I370419 | 8/2012 |
| TW | 201351375 A | 12/2013 |
| WO | WO2015/100333 A1 | 7/2015 |

\* cited by examiner

ELECTRONIC DEVICES WITH FLEXIBLE DISPLAYS

BACKGROUND

Electronic visual displays correspond to display devices for presentation of images, text, or video transmitted electronically. Examples of such display devices include, but are not limited to, television sets, computer monitors, digital signage and applications in mobile computing, like tablet computers, notebook computers, and smartphones.

DETAILED DESCRIPTION

Examples disclosed herein provide electronic devices with flexible displays, which correspond to electronic visual displays that are flexible in nature. As will be further described, an electronic device with a flexible display may transition between two types of viewing modes; a flat mode and a curved mode. In flat mode, the flexible display may be flat, which, as an example, is suitable when multiple users are present. In curved mode, the flexible display may be curved, providing, for example, an ergonomic and immersive working environment for a single user. Curving the flexible display may complement the user's focal center and cone of vision, blocking out lateral distractions and enhancing immersive/focused computing, which may contribute towards an increased level of productivity.

Figure 1A:
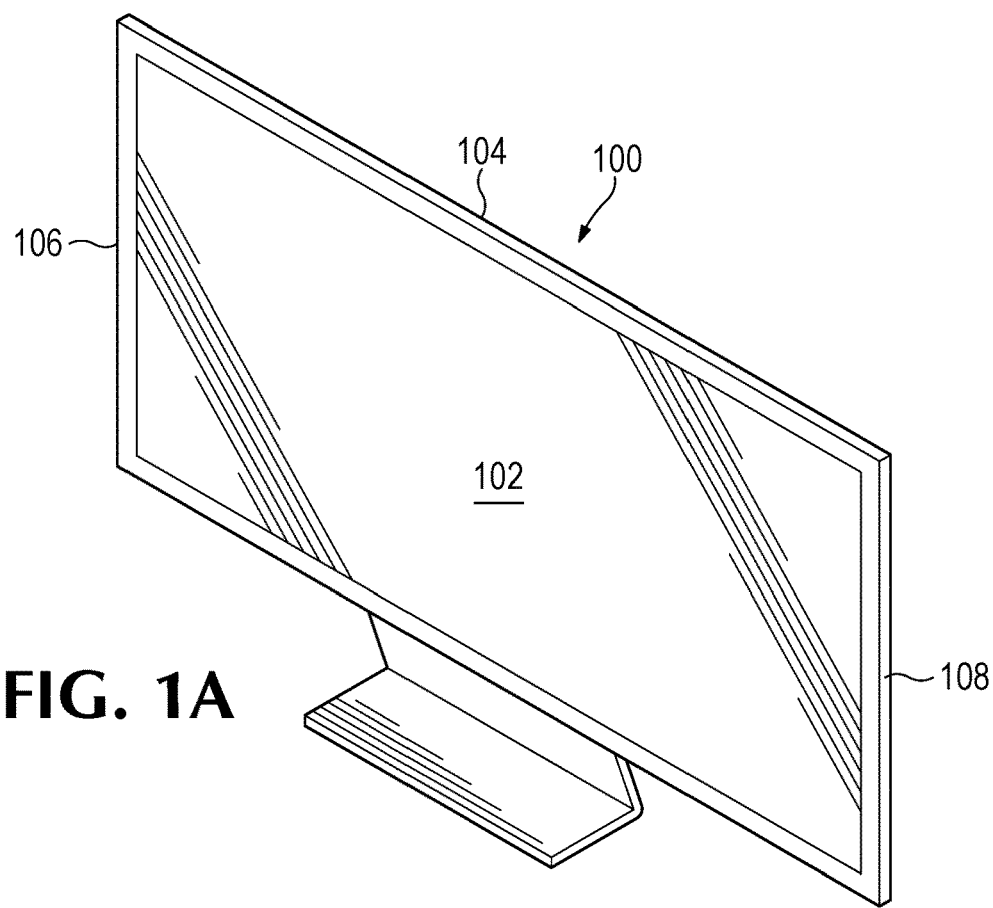
FIGS. 1A-B illustrate various viewing modes of an electronic device with a flexible display, according to an example.
Figure 1B:
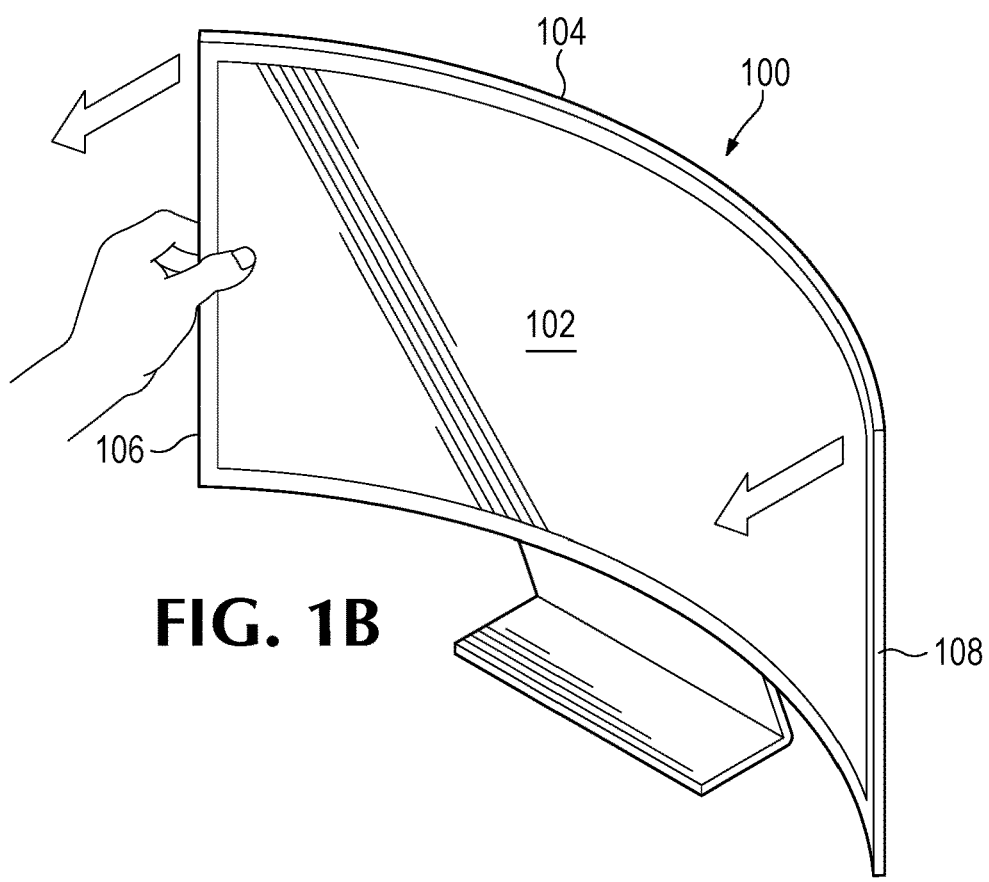

With reference to the figures, FIGS. 1A-B illustrate various viewing modes of an electronic device 100 with a flexible display 102, according to an example. By using the flexible display 102, the electronic device 100 may provide various viewing modes. For example in FIG. 1A, the electronic device 100 is in a flat mode, which, as an example, is suitable when multiple users are present. Referring to FIG. 1B, the electronic device 100 is in a curved mode, providing, for example, an immersive environment for a single user. As an example, the electronic device 100 includes a supporting structure 104 arranged at a back of the flexible display 102

As an example, the supporting structure 104 synchronously curves the flexible display 102 when a proximal end of the electronic device 100 is to be actuated. For example, the supporting structure 104 includes structural hinging elements that allow a synchronized curving of the flexible display 102 in a balanced/even manner, in order to achieve the proper curve needed by the user. As an example, as the user pulls one end 106 of the electronic device 100 towards themselves, as illustrated in FIG. 1B, a network of synchronized hinges allows both ends 106, 108 of the electronic device 100 to move in a smooth motion and in equal increments towards the user, as indicated by the arrows, thus forming an immersive workspace around the user's full cone of vision. Via the structural hinging elements, the supporting structure 104 may synchronously curve the flexible display 102 in a symmetric manner, as illustrated. When transitioning between the flat mode and the curved mode, the supporting structure 104 may synchronously curve the flexible display 102 by moving at least one of a center and both ends 106, 108 of the flexible display 102 relative to each other, to form one of a flat surface configuration and a curved surface configuration of the flexible display 102. As an example, the center of the flexible display 102 may be moved relative to the ends 106, 108 of the flexible display 102 in order to form either configuration.

As an example, the form factor for such electronic devices 100 may be applicable across various types electronic devices, such as a standalone all-in-one (AiO) computer, or for a monitor that can work with any computer. Examples of other electronic devices that can incorporate the form factor illustrated include, but are not limited to, television sets and digital signage. As an example, the electronic device 100 can include speakers and various ports, chosen according to the type of electronic device (e.g., USB, HDMI, or VGA).

Figure 2A:
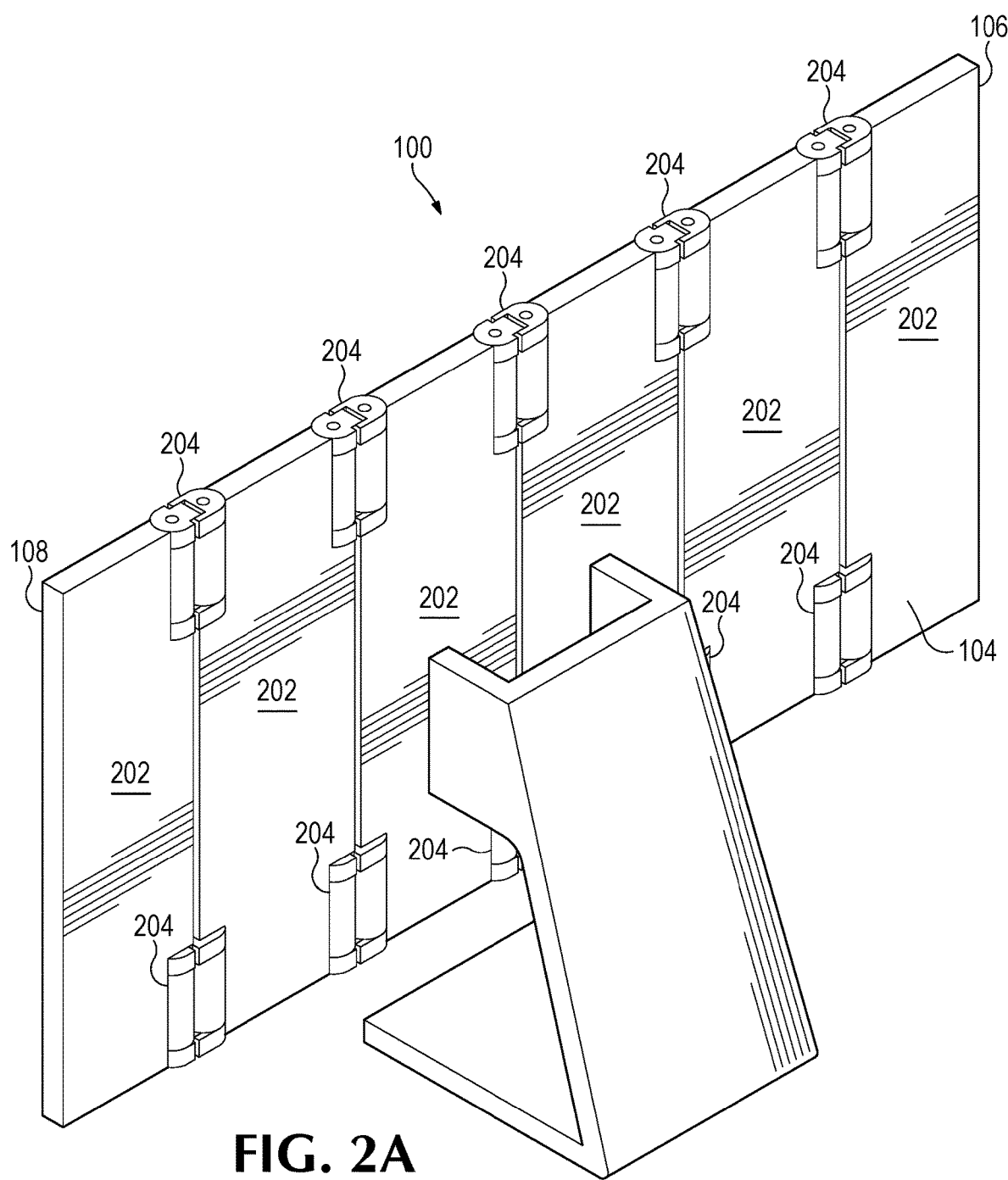
FIGS. 2A-B illustrate a back surface of the electronic device, including a supporting structure for the flexible display, according to an example.
Figure 2B:
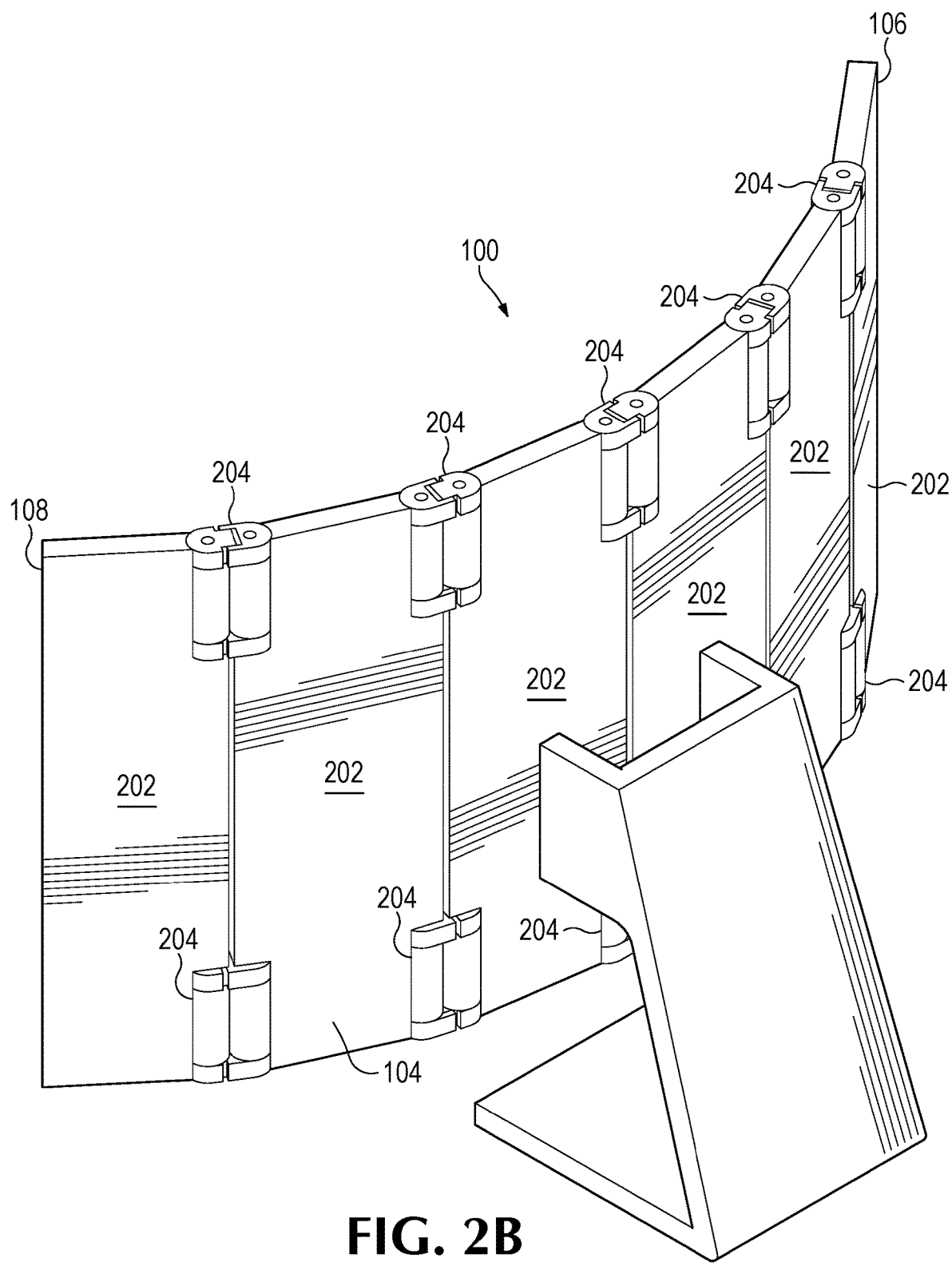

FIGS. 2A-B illustrate a back surface of the electronic device 100, including the supporting structure 104, according to an example. As illustrated, the supporting structure 104 includes support members 202 to support the flexible display 102, and hinge mechanisms 204 to connect the support members 202 to each other. The number of support members 202 used to support the flexible display 102 may vary from what is illustrated. In addition, the number of hinge mechanisms 204 to connect any two support members 202 may vary as well from what is illustrated. As will be further described, the hinge mechanisms 204 enables the synchronous curving of the flexible display 102 of the electronic device 100. However, the type of hinge used for providing the synchronous curving of the flexible display 102 may vary from what is described or illustrated.

Figure 3A:
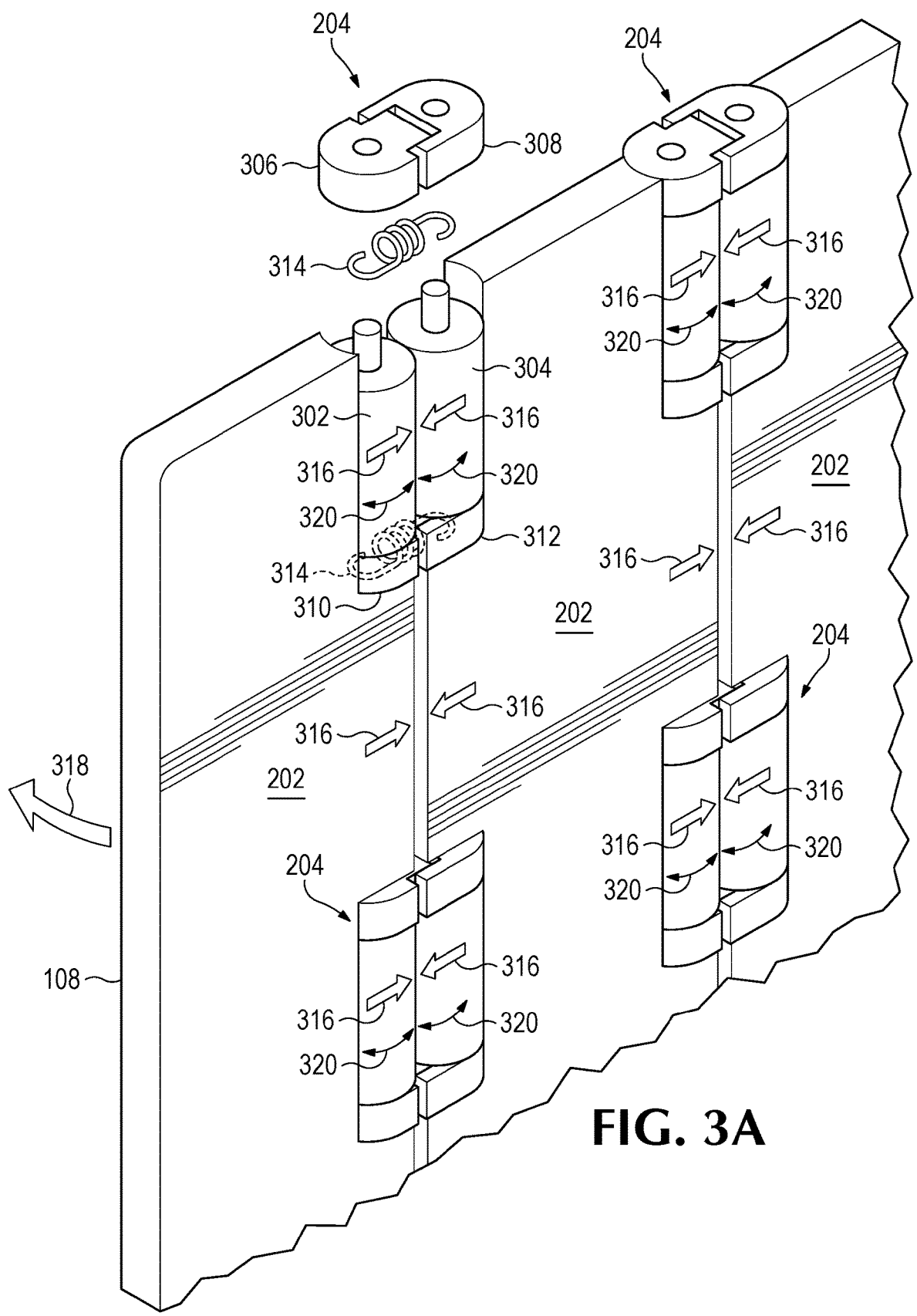
FIGS. 3A-B illustrate components of a hinge mechanism, that enables synchronous curving of the flexible display of the electronic device, according to an example.
Figure 3B:
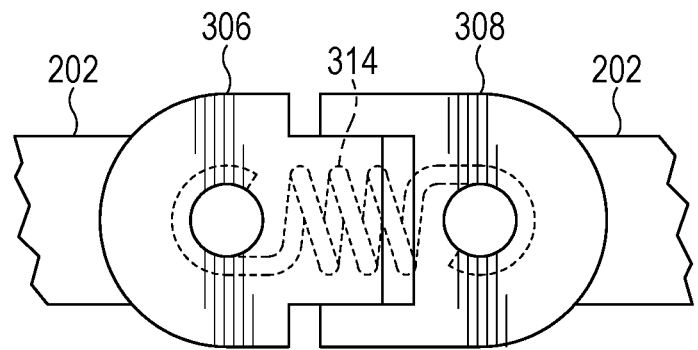

FIGS. 3A-B illustrate components of a hinge mechanism 204 that connects a first support member 202 and a second support member 202, and enables the synchronous curving of the flexible display 102 of the electronic device 100, according to an example. As illustrated, each hinge mechanism 204 includes circular hinge surfaces 302, 304 that are held together under tension via spring mechanisms 314 disposed in each of the hinge mechanisms 204 (tension indicated by arrows 316). FIG. 3B illustrates a top view of the hinge mechanism 204, with the spring mechanism 314 coupling the hinge surfaces 302, 304 together. The number of spring mechanisms 314 disposed in each of the hinge mechanisms 204 may vary from what is illustrated. The tension provided by the spring mechanisms 314 allows for the support members 202 to remain close to each other as well (also indicated by arrows 316).

As an example, the hinge surfaces 302, 304 may be rubberized, in order to increase friction between the hinge surfaces 302, 304 and allow for the synchronous and smooth curving of the flexible display 102, as will be further described. Lastly, each hinge mechanism 204 may be capped off by a top plate and a bottom plate to secure either end of the circular hinge surfaces 302, 304. Each plate may be comprised of two parts, to correspond to the two hinge surfaces 302, 304. Referring to FIG. 3A, the top plate Includes a first part 306 and a second part 308. Similarly, the bottom plate includes a first part 310 and a second part 312.

Referring to FIG. 3A, when the proximal end 108 of the electronic device 100 is actuated, or pulled towards a user, as indicated by arrow 318, the supporting structure 104, via the components of the hinge mechanisms 204 described above, synchronously curves the flexible display 102 (e.g., see FIG. 2B). For example, as the support member 202 with the proximal end 108 is pulled towards the user (arrow 318), the outward rolling of hinge surface 302 causes the outward rolling of hinge surface 304, indicated by arrows 320. Similarly, such movement between the hinge surfaces 302, 304 takes place along all the hinge mechanisms 204 of the supporting structure 104, allowing for the synchronous and smooth curving of the flexible display 102. As mentioned above, the hinge surfaces 302, 304 may be rubberized in order to increase the friction between the hinge surfaces 302, 304, providing a smooth motion between the hinge surfaces 302, 304.

Figure 4:
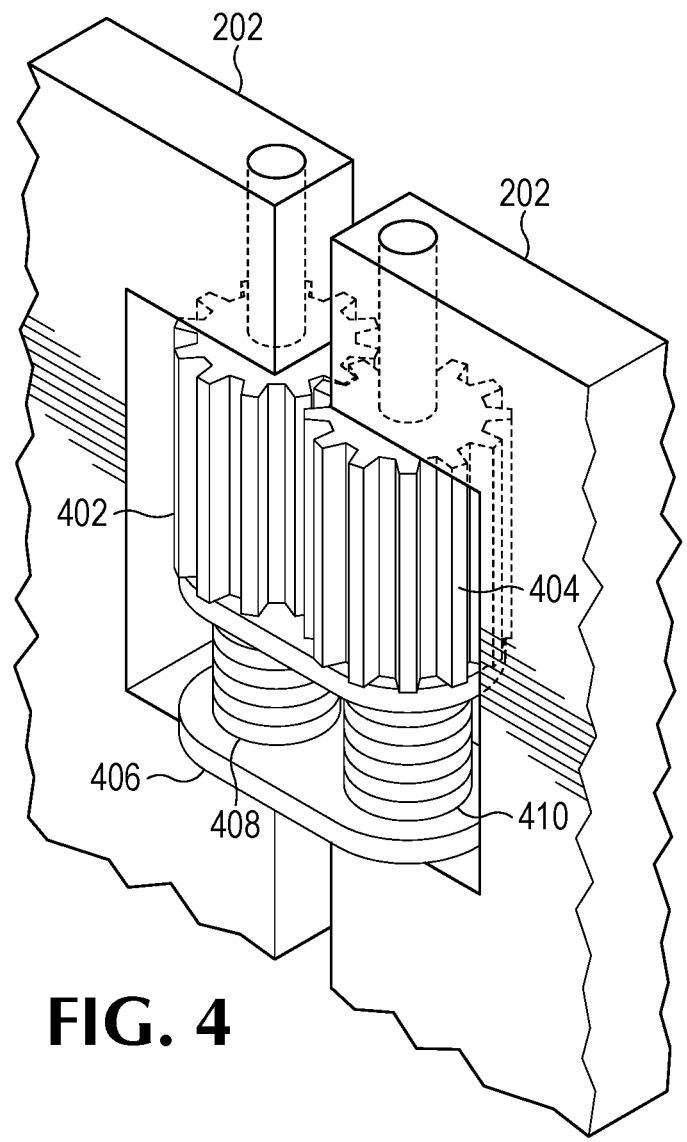
FIG. 4 illustrates another hinge mechanism that may be used for enabling the synchronous curving of the flexible display, according to an example.

FIG. 4 illustrates another hinge mechanism that may be used for enabling the synchronous curving of the flexible display 102, according to an example. As illustrated, the hinge mechanism may include gears 402, 404 to synchronously curve the support members 202 of the supporting structure 104 to form one of a flat surface configuration and a curved surface configuration of the flexible display 102. For example, as the support member 202 coupled to gear 404 is pulled towards a user, the movement of gear 404 initiates movement of gear 402, which is coupled to another support member 202 of the supporting structure 104. Similarly, such movement between the gears 402, 404 takes place along the other hinge mechanisms of the supporting structure 104, allowing for the synchronous and smooth curving of the flexible display 102.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An electronic device comprising:
a flexible display; and
a supporting structure arranged at a back of the flexible display, wherein the supporting structure comprises:
support members to support the flexible display; and
hinge mechanisms to connect the support members to each other,
wherein each hinge mechanism of the hinge mechanisms comprises gears to synchronously curve the support members to form one of a flat surface configuration and a curved surface configuration of the flexible display when a proximal end of the electronic device is to be actuated.

2. The electronic device of claim 1, wherein actuating the proximal end of the electronic device comprises pulling the proximal end of the electronic device towards a user.

3. The electronic device of claim 1, wherein the supporting structure is to synchronously curve the flexible display in a symmetric manner.

4. The electronic device of claim 1, wherein the supporting structure is to synchronously curve the flexible display by moving at least one of a center and both ends of the flexible display relative to each other to form one of a flat surface configuration and a curved surface configuration of the flexible display.

5. The electronic device of claim 1, wherein the hinge mechanisms are held under tension via spring mechanisms disposed in each of the hinge mechanisms.

6. An electronic device comprising:
a flexible display; and
a supporting structure arranged at a back of the flexible display, wherein the supporting structure comprises:
support members to support the flexible display; and
hinge mechanisms to connect the support members to each other, wherein each hinge mechanism of the hinge mechanisms comprises gears to enable synchronous curving of the flexible display when a proximal end of the electronic device is to be actuated.

7. The electronic device of claim 6, wherein the hinge mechanism comprises:
a spring mechanism;
first and second circular hinge surfaces held together under tension via the spring mechanism; and
top and bottom plates to secure either end of the first and second circular hinge surfaces.

8. The electronic device of claim 7, wherein the first and second circular hinge surfaces are rubberized to increase friction between the first and second circular hinge surfaces.

9. The electronic device of claim 7, wherein when the proximal end of the electronic device is to be actuated, an outward rolling of the first circular hinge surface is to cause an outward rolling of the second circular hinge surface.

10. The electronic device of claim 6, wherein the hinge mechanism is to synchronously curve the flexible display in a symmetric manner.

11. An electronic device comprising:
a flexible display; and
a supporting structure arranged at a back of the flexible display, wherein the supporting structure comprises support members to support the flexible display and hinge mechanisms to connect the support members to each other, wherein each hinge mechanism comprises gears to synchronously curve the flexible display by moving a center of the flexible display relative to both ends of the flexible display, to form one of a flat surface configuration and a curved surface configuration of the flexible display.

* * * * *